(12) United States Patent
Valencia Lopez et al.

(10) Patent No.: US 9,762,490 B2
(45) Date of Patent: Sep. 12, 2017

(54) CONTENT FILTERING FOR INFORMATION CENTRIC NETWORKS

(71) Applicant: Telefonaktiebolaget L M Ericsson (publ), Stockholm (SE)

(72) Inventors: Carlos Valencia Lopez, Madrid (ES); Yvan Royon, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 100 days.

(21) Appl. No.: 14/524,937

(22) Filed: Oct. 27, 2014

(65) Prior Publication Data

US 2016/0119234 A1 Apr. 28, 2016

(51) Int. Cl.
H04L 12/741 (2013.01)
H04L 12/933 (2013.01)
H04L 29/08 (2006.01)
H04L 29/06 (2006.01)

(52) U.S. Cl.
CPC ............ H04L 45/745 (2013.01); H04L 49/15 (2013.01); H04L 63/0245 (2013.01); H04L 63/102 (2013.01); H04L 67/306 (2013.01); H04L 67/327 (2013.01)

(58) Field of Classification Search
CPC combination set(s) only.
See application file for complete search history.

(56) References Cited

U.S. PATENT DOCUMENTS

| | | | | |
|---|---|---|---|---|
| 9,253,087 | B2 * | 2/2016 | Zhang | H04L 45/74 |
| 2002/0111180 | A1 * | 8/2002 | Hogan | H04W 48/16 |
| | | | | 455/518 |
| 2004/0117426 | A1 * | 6/2004 | Rudkin | H04L 65/605 |
| | | | | 709/200 |
| 2009/0287835 | A1 | 11/2009 | Jacobson | |
| 2010/0195655 | A1 * | 8/2010 | Jacobson | H04L 45/748 |
| | | | | 370/392 |
| 2011/0286459 | A1 | 11/2011 | Rembarz et al. | |

(Continued)

FOREIGN PATENT DOCUMENTS

| | | |
|---|---|---|
| AU | 2014100338 A4 | 5/2014 |
| EP | 2120419 A2 | 11/2009 |

OTHER PUBLICATIONS

U.S. Appl. No. 14/524,932, filed Oct. 27, 2014, Pending.

(Continued)

*Primary Examiner* — Yee Lam
(74) *Attorney, Agent, or Firm* — Nicholson, De Vos, Webster & Elliot, LL

(57) ABSTRACT

A method provides filtering of content objects on a per user basis at a gateway node in a content centric networking (CCN) network. The gateway node has a network interface with a network of a user device originating a CCN interest packet. The method includes receiving a CCN interest packet including a CCN name and a user identity, retrieving a content object identified by the CCN name, and retrieving allowed categories of the user. The method further includes retrieving categories of the content object, checking whether allowed categories of the user enable retrieval of the content object based on comparison with the categories of the content object, and forwarding the content object to user in response to the allowed categories enabling retrieval of the content object for the user.

20 Claims, 10 Drawing Sheets

(56) References Cited

U.S. PATENT DOCUMENTS

| | | | | |
|---|---|---|---|---|
| 2012/0136945 | A1* | 5/2012 | Lee | H04L 67/2838 709/206 |
| 2012/0244832 | A1 | 9/2012 | Carlander | |
| 2012/0297088 | A1* | 11/2012 | Wang | H04L 63/0272 709/238 |
| 2012/0317643 | A1* | 12/2012 | Kim | H04L 63/1458 726/22 |
| 2013/0016695 | A1* | 1/2013 | Ravindran | H04L 67/327 370/331 |
| 2013/0060962 | A1* | 3/2013 | Wang | H04L 67/327 709/238 |
| 2013/0219081 | A1 | 8/2013 | Qian et al. | |
| 2014/0020102 | A1 | 1/2014 | Srinivasan et al. | |
| 2014/0289325 | A1* | 9/2014 | Solis | H04L 67/327 709/204 |
| 2014/0321480 | A1* | 10/2014 | Xue | H04L 61/3015 370/475 |
| 2016/0255535 | A1* | 9/2016 | De Foy | H04L 67/2804 |

OTHER PUBLICATIONS

Ali, Z., et al., "Node-IDS Based Resource Reservation Protocol (RSVP) Hello: A Clarification Statement", Network Working Group; RFC 4558; Jun. 2006; 7 pages.

Andersson, L., et al., "LDP Specification", Network Working Group; RFC 5036; Oct. 2007; 135 pages.

Awduche, D. et al., ""RSVP-TE: Extensions to RSVP for LSP Tunnels,"", Network, Working Group; RFC 3209; Dec. 2001; 61 pages.

Babiarz, J. et al., "Configuration Guidelines for DiffServ Service Classes", Network Working Group; RFC 4594; Aug. 2006; 57 pages.

Baker, F., et al., "A Differentiated Services Code Point (DSCP) for Capacity-Admitted Traffic", Internet Engineering Task Force (IETF); RFC 5865; May 2010; 14 pages.

Baker, F., et al., "Management Information Base for the Differentiated Services Architecture", Network Working Group; RFC 3289; May 2002; 107 pages.

Berger, L., "Generalized Multi-Protocol Label Switching (GMPLS) Signaling Resource ReserVation Protocol-Traffic Engineering (RSVP-TE)", Network Working Group; RFC 3473; Jan. 2003; 42 pages.

Bernet, Y. et al., "An Informal Management Model for Diffserv Routers", Network Working Group; RFC 3290, May 2002; 56 pages.

Black, D. "Differentiated Services and Tunnels", Network Working Group; RFC 2983; Oct. 2000; 14 pages.

Black, D. et al., "Per Hop Behavior Identification Codes", Network Working Group, Jun. 2001, Standards Track, RFC 3140, pp. 1-8.

Blake, S. et al., "An Architecture for Differentiated Services", Network Working Group; RFC 2475; Dec. 1998; 36 pages.

Borman, D. et al., "IPv6 Jumbograms", Network Working Group; RFC 2675; Aug. 1999; 9 pages, Copyright The Internet Society 1999.

Braden, R., et al., ""Resource ReSerVation Protocol (RSVP)—Version 1 Functional Specification,"", Network Working Group, RFC 2205; Sep. 2007; 112 pages.

Chan, K., et al., "Differentiated Services Quality of Service Policy Information Base", Network Working Group; RFC 3317; Mar. 2003; 96 pages.

Charny, A., et al., "Supplemental Information for the New Definition of the EF PHB (Expedited Forwarding Per-Hop Behavior)", Network Working Group; RFC 3247; Mar. 2002; 24 pages.

Davie, B., et al., "An Expedited Forwarding PHB (Per-Hop Behavior)", The Internet Society, Mar. 2002, RFC 3246, pp. 1-15.

Deering, et al., "Internet Protocol", IETF RFC 2460, version 6 (IPv6) Specification, Dec. 1998, 37 pages, http://www.ieff.org/rfc/rfc2460.txt.

Eggert, L., et al., "Unicast UDP Usage guidelines for Application Designers", Network Working Group; RFC 5405; Nov. 2008; 27 pages.

Elson, J., "Internet Content Adaptation Protocol (ICAP)", Network Working Group; Request for Comments: 3507; Apr. 2003; 49 pages.

Fenner, B., et al., "Management Information Base for the User Datagram Protocol (UDP)", Network Working Group; RFC 4113; Jun. 2005; 19 pages.

Grossman, D., ""New Terminology and Clarifications for Diffserv",", RFC 3260, Apr. 2002.

Hedrick, C., "Routing Information Protocol", Network Working Group; RFC 1058; Jun. 1988; 33 pages.

Heinanen, J., et al., "Assured Forwarding PHB Group", The Internet Society, RFC 2597, (Jun. 1999), 11 pages.

Housley, R., et al., "Using Advanced Encryption Standard (AES) CCM Mode with IPsec Encapsulating Security Payload (ESP)", Network Working Group; RFC 4309; Dec. 2005. 13 pages.

Kent, S., et al., "Security Architecture for the Internet Protocol", Network Working Group; RFC 4301; Dec. 2005; 101 pages.

Kompella, K., et al., "Procedures for Modifying the Resource reSerVation Protocol (RSVP)", Network Working Group; RFC 3936; Oct. 2004; 7 pages.

Malkin, G., et al., "RIP Version 2", Network Working Group; RFC 2453; Nov. 1998; 39 pages.

Malkin, G., et al., "RIPng for IPv6", Network Working Group; RFC 2080; Jan. 1997; 19 pages.

Mosko, Marc, "CCNx 1.0 Protocol Specification Roadmap", PARC; Apr. 14, 2014 (rev 3); 4 pages.

Moy, John T., "OSPF Version 2", RFC 2328 (rfc2328). The Internet Engineering Task Force, 48377 Fremont Blvd. Suite 117, Fremont, CA 94538, USA, Apr. 1998; downloaded on Mar. 17, 2009 from http://rfc.dotsrc.org/rfc/rfc2328.html, (Apr. 1998), 246 pages.

Nichols, K., et al., "Definition of Differentiated Services Per Domain Behaviors and Rules for their Specification", Network Working Group; RFC 3086; Apr. 2001; 24 pages.

Nichols, K., et al., "Definition of the Differentiated Services Field (DS Field) in the IPvd and IPv6 Headers", The Internet Society, Dec. 1998, RFC 2474, pp. 1-19.

Oran, D., "RFC 1142 OSI IS-IS Intra-Domain Routing Protocol", Digital Equipment Corp. Feb. 1990 http://www.faqs.org/rfcs/rfc1142.html., Oct. 19, 2011.

Polk, J., et al., "A Resource Reservation Protocol (RSVP) Extension for the Reduction of Bandwidth of a Reservation Flow", Network Working Group; RFC 4495; May 2006; 21 pages.

Postel, J., ""User Datagram Protocol",", Aug. 28, 1980, 3 pages, RFC 768.

Postel, J., "Transmission Control Protocol", STD 7, RFC 793, Internet Standard, Information Sciences Institute, USC, 4676 Admiralty Wy, Marina del Rey, CA 90291., (Sep. 1981), 91 pages.

Rekhter, Y., et al., ""A Border Gateway Protocol 4 (BGP-4)",", RFC 4271, Jan. 2006.

Rosen, et al., Network Working Group; RFC 4364; ;BGP/MPLS IP Virtual Private Networks (VPNs), copyright The Internet Society (2006); Feb. 2006; 47pgs.

Shenker, S., et al., "Specification of Guaranteed Quality of Services", Network Working Group; RFC 2212; Sep. 1997; 20 pages.

Smetters, Diana, "CCNx (Pre 1.0) Access Control Specifications", PARC; Jul. 30, 2010; 24 pages.

Socolofsky, T., et al., "A TCP/IP Tutorial", Network Working Group; RFC 1180; Jan. 1991; 28 pages.

Wroclawski, J., "Specification of the Controlled-Load Network Element Service", Network Working Group; RFC 2211; Sep. 1997; 19 pages.

Wroclawski, J., "The Use of RSVP with IETF Integrated Services", Network Working Group; RFC 2210; Sep. 1997; 33 pages.

3GPP TS 32.426 v9.1.0: "Telecommunication management; Performance Management (PM); Performance measurements Evolved Packet Core (EPC) network," 3rd Generation Partnership Project, Technical Specification Group Services and System Aspects, (Release 9), Sep. 2009, 47 pages.

RFC 5340: Coltun, et al., "OSPF for IPv6," Jul. 2008, 94 pages, Network Working Group, Request for Comments: 5340, The IETF Trust.

Cranor, et al., "A Catalog of Tools that Support Parents' Ability to Choose Online Content Appropriate for their Children," retrieved

(56) References Cited

OTHER PUBLICATIONS from the internet at http://www.research.att.com on Nov. 29, 2001, Nov. 1997, 13 pages, XP002184382.
Ion, et al., "Toward content-centric privacy in ICN," SIGCOMM, ACM, Aug. 27, 2013, pp. 513-514, XP058030834.
Mosko, "CCNx 1.0 Protocol Introduction," Palo Alto Research Center, Inc., (PARC), Apr. 2, 2014, 10 pages.
Tagger, et al., "Realising an application environment for information-centric networking," Computer Networks, vol. 57, No. 16, Nov. 13, 2013, pp. 3249-3266, XP028744694.

* cited by examiner

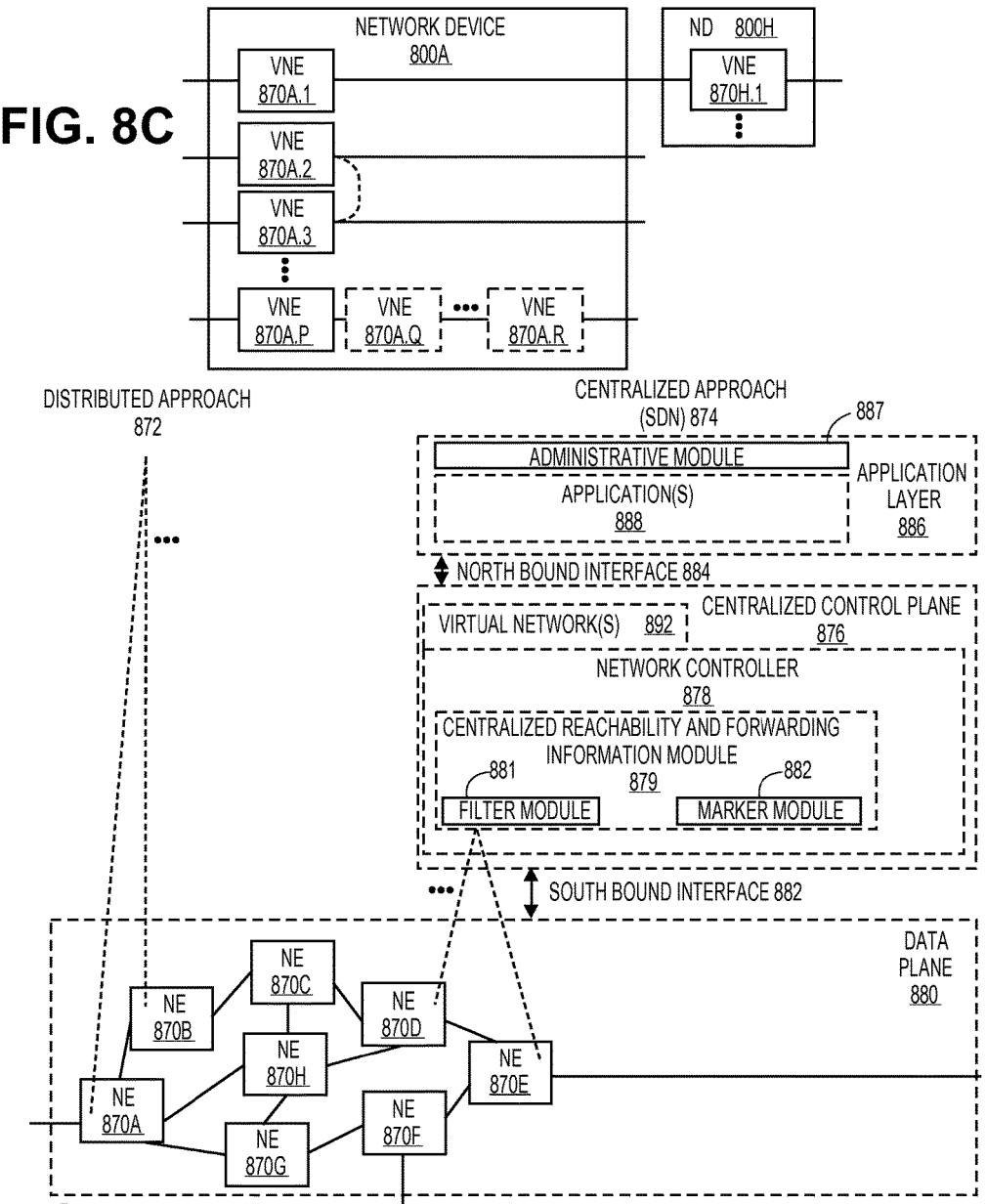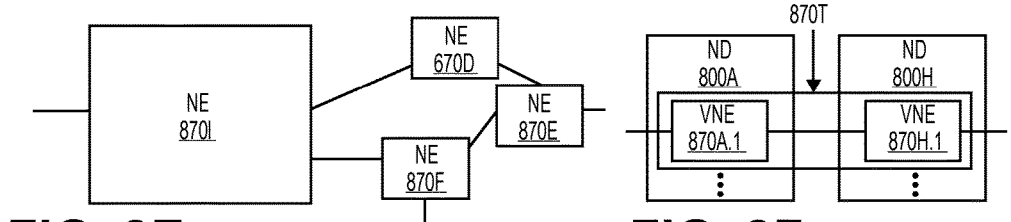

CONTENT FILTERING FOR INFORMATION CENTRIC NETWORKS

CROSS-REFERENCE TO RELATED APPLICATION

Cross-reference is made to U.S. patent application Ser. No. 14/524,932, by Carlos VALENCIA LOPEZ, et al. for "CONTENT FILTERING FOR INFORMATION CENTRIC NETWORKS" filed on the same date as the present application and commonly owned. The cross-referenced application is incorporated herein by reference.

FIELD

Embodiments of the invention relate to filtering of content in information centric networking (ICN) networks. Specifically, the embodiments relate to a method and system of marking content objects with categories and enabling per user content filtering in a content centric networking (CCN) network or a named data domain (NDN) network.

BACKGROUND

An ICN network is a conceptualization of networking protocol stack, in particular layers 3 and above of a network protocol stack. The CCN network and NDN network are particular architectures and implementation of an ICN network. ICN networks, CCN and NDN networks are based on the premise of naming resources in these networks. In particular the naming relates to the use of a globally shared namespace for objects that allows entities in these networks to retrieve any content of interest. NDN networks and CCN networks have similar architectures, thus for sake of clarity examples related to CCN networks are discussed herein below.

Thus, within a CCN network a name is utilized to identify a content object instead of an Internet Protocol (IP) address of the content or a host of the content. In an IP network, routing is based on host names (e.g., source and destination addresses). In a CCN network by contrast, routing is based on a uniform resource identifier (URI) or similar identifier for a content object. CCN routing is performed hop-by-hop, using a longest prefix matching on the CCN name. All communications seeking to access data are framed as a request and response transaction. A CCN client sends a message referred to as a CCN interest to the nodes in the CCN. The nodes of the CCN network respond with a content object identified by a CCN name in the CCN interest. These CCN content objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN network node receives a CCN interest packet, it can check whether its local content store has the requested content object and can send it back if found. The look up in the content store is by the CCN name. If the CCN name is not found in the local content store, then the CCN interest is forwarded according to entries for the CCN name in a forwarding information base (FIB) of the CCN network node.

SUMMARY

A method provides filtering of content objects on a per user basis at a gateway node in a content centric networking (CCN) network. The gateway node has a network interface with a network of a user device originating a CCN interest packet. The method includes receiving a CCN interest packet including a CCN name and a user identity, retrieving a content object identified by the CCN name, and retrieving allowed categories of the user. The method further includes retrieving categories of the content object, checking whether allowed categories of the user enable retrieval of the content object based on comparison with the categories of the content object, and forwarding the content object to user in response to the allowed categories enabling retrieval of the content object for the user.

A network device implements the method for filtering content objects on a per user basis at a gateway node in a content centric networking (CCN) network, where the gateway node has a network interface with a network of a user device originating a CCN interest packet. The network device includes a non-transitory computer-readable medium having stored therein a filter module, and a network processor coupled to the non-transitory computer-readable medium. The network processor is configured to execute the filter module. The filter module is configured to receive a CCN interest packet including a CCN name and a user identity, to retrieve a content object identified by the CCN name, and to retrieve allowed categories of the user, to retrieve categories of the content object. The filter module is further configured to check whether allowed categories of the user enable retrieval of the content object based on comparison with the categories of the content object, and to forward the content object to user in response to the allowed categories enabling retrieval of the content object for the user.

A computing device implements a plurality of virtual machines for implementing network function virtualization (NFV). A virtual machine from the plurality of virtual machines is configured to execute a method for filtering content objects on a per user basis at a gateway node in a content centric networking (CCN) network. The gateway node has a network interface with a network of a user device originating a CCN interest packet. The computing device includes a non-transitory computer-readable medium having stored therein a content filter module, and a processor coupled to the non-transitory computer-readable medium. The processor is configured to execute the virtual machine. The virtual machine executes the filter module. The filter module is configured to receive a CCN interest packet including a CCN name and a user identity, to retrieve a content object identified by the CCN name, to retrieve allowed categories of the user, and to retrieve categories of the content object. The filter module is further configured to check whether allowed categories of the user enable retrieval of the content object based on comparison with the categories of the content object, and to forward the content object to user in response to the allowed categories enabling retrieval of the content object for the user.

A control plane device implements at least one centralized control plane for a software defined network (SDN). The centralized control plane is configured to execute a method for filtering content objects on a per user basis at a gateway node in a content centric networking (CCN) network. The gateway node has a network interface with a network of a user device originating a CCN interest packet. The control plane includes a non-transitory computer-readable medium having stored therein a filter module, and a processor coupled to the non-transitory computer-readable medium. The network processor is configured to execute the filter module. The filter module is configured to receive a CCN interest packet including a CCN name and a user identity, to retrieve a content object identified by the CCN name, and to retrieve allowed categories of the user. The filter module is further configured to retrieve categories of the content object, to check whether allowed categories of the user enable retrieval of the content object based on comparison with the categories of the content object, and to forward the content object to user in response to the allowed categories enabling retrieval of the content object for the user.

BRIEF DESCRIPTION OF THE DRAWINGS

The invention may best be understood by referring to the following description and accompanying drawings that are used to illustrate embodiments of the invention. In the drawings:

FIG. 8C illustrates various exemplary ways in which virtual network elements (VNEs) may be coupled according to some embodiments of the invention.

FIG. 8D illustrates a network with a single network element (NE) on each of the NDs of FIG. 8A.

FIG. 8E illustrates an example where each of the NDs implements a single NE (see FIG. 8D), but the centralized control plane has abstracted multiple of the NEs in different NDs into a single NE in one of the virtual network(s) of FIG. 8D, according to some embodiments of the invention.

FIG. 8F illustrates a case where multiple VNEs are implemented on different NDs and are coupled to each other, and where the centralized control plane has abstracted these multiple VNEs such that they appear as a single VNE within one of the virtual networks of FIG. 8D, according to some embodiments of the invention.

DETAILED DESCRIPTION

Figure 1:
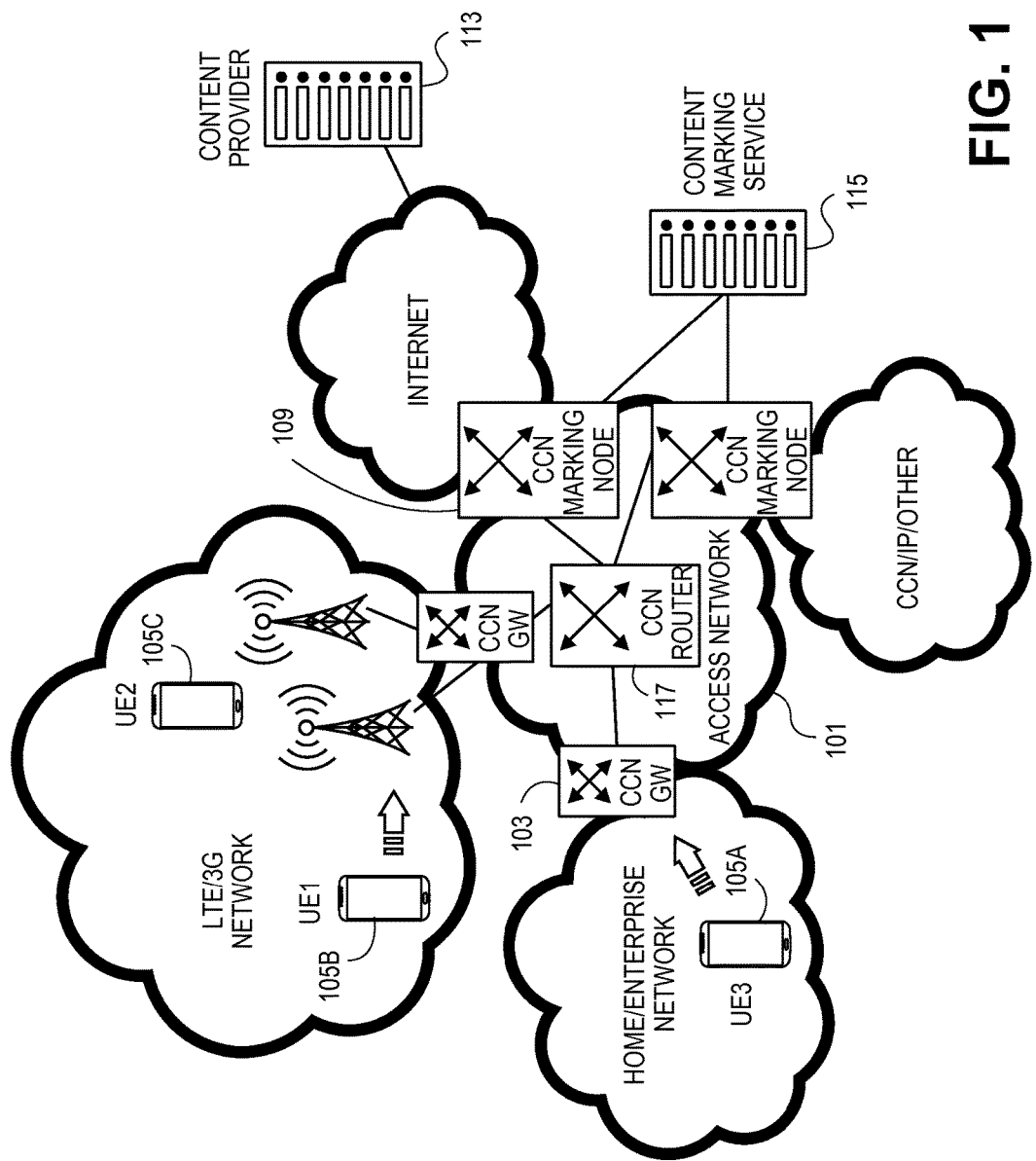
FIG. 1 is a diagram of one embodiment of a CCN network including placement of CCN gateways and CCN marking nodes in the CCN network.

The following description describes methods and apparatus for marking content objects with categories to enable per user content filtering in a CCN network at CCN gateways. The methods and apparatus enable per user content filtering at CCN gateways while maintaining cross user caching capabilities. NDN networks have similar architecture, processes and structures as those used in CCN networks. The examples and embodiments described herein relate to CCN networks, however, one skilled in the art would understand that the methods, processes, structures and functions described herein with relation to CCN networks are also applicable to NDN networks. In addition, many of the processes, methods, techniques and functions would be applicable to similar ICN networks such as network of information (NetInf), MobilityFirst, GreenICN, PURSUIT and similar ICN networks.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

Content filtering is a functionality widely used by administrators of public and private networks. Content filtering implements a system for blocking certain users of a system from accessing defined types of content such as systems for blocking minors from accessing sexually explicit materials. Implementing content filtering systems can be of particular importance in operator networks or Internet service provider networks, where operators of these networks are sometimes compelled by national or state laws to implement content filtering, e.g., content filtering for parental control.

For this purpose, the Internet Engineering Task Force (IETF) built a protocol called Internet Content Adaptation Protocol (ICAP) which is defined in RFC 3507. In this architecture, a content filtering engine analyzes content requests forwarded by the ICN network. The content filtering engine detects the uniform resource locators (URLs) that are sent in a request to the ICAP server that executes the content filtering engine and sends a response with the categories those URLs belong to.

The content filtering engine then processes the response sent by the ICAP server to check if the user that generated the request is allowed to receive the requested content. That decision is based on subscriber information associated with the user that is retrieved either from an lightweight directory access protocol (LDAP) server, an Authentication, Authorization and Accounting (AAA) node via remote authentication dial in user service (RADIUS), or from a policy and charging rules function (PCRF) via a Gx interface. Each of these methods are currently used in mobile networks to exchange subscriber information. In addition, this same architecture can be also used in fixed networks with equivalent nodes such as a border network gateway (BNG).

To be able to apply content filtering, the content filtering engine needs to know who each user of the network is and what categories of content they are permitted to access. In mobile networks, this problem is solved following the third generation partnership project (3GPP) standard 32.426 where the standard describes the attach procedures. These procedures describe the way in which any device has to connect to the network. Once the procedure ends successfully, the user equipment (i.e., any user device that is connected to the network such as a mobile device) can start forwarding and receiving data traffic (i.e., data packets), which can always be associated to that user or the user equipment.

The Evolved Packet Core (EPC) is an architecture utilized with mobile networks to provide access between these networks and various services in the EPC and access to services over the Internet. In the EPC architecture all data traffic from the user equipment destined for these services or the Internet will go through the serving gateway and/or the packet data network (PDN) gateway. Thus, content filtering can be implemented at these nodes.

However, in contrast to the 3GPP and EPC architecture, an ICN network or more specifically a CCN network does not have the same architecture and operates with differing requirements that necessitate a different approach to content filtering. In the case of CCN, the architecture is different because the CCN network provides the capability for pervasive caching of content objects, there is no guarantee that a single gateway, especially a northbound (i.e., upstream) gateway, will see all data traffic in the network. Thus, a more distributed approach to content filtering has been developed as set forth herein to accommodate this difference in architecture.

FIG. 1 is a diagram of one example of an example architecture of a CCN network. The CCN network in this example is an access network 101. The access network 101 is in communication with a set of separately administered networks including a home/enterprise network, the Internet and an LTE/3G mobile network. The example shows that the access network can be further in communication with any number of additional CCN networks, IP networks or other types of networks. In this example, the access network implements the content filtering system and processes described further herein below and is provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. For sake of clarity, the nodes implementing the content filtering system are shown and described. The CCN nodes are network devices (ND), as discussed further herein below. The CCN nodes include CCN routers 117, CCN gateways (GW) 103 and CCN marking nodes 109. The CCN router 117 manages CCN interest packets, forwarding these packets toward the corresponding content provider 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. The CCN gateways 103 identify users of the user equipment 105A-C and apply the content filtering policies on a per user basis using the user identification information obtained from the user equipment 105A-C and the networks of the user equipment 105A-C in combination with the content object category information that is provided by the CCN marking module 109. The process for content filtering implemented by the CCN gateways 103 is discussed further herein below.

The CCN marking nodes 109 communicate with the separately administered networks (i.e., networks having a separate administrative domain). The CCN marking nodes 109 are responsible for tagging incoming content objects from the adjoining networks (i.e., adding an additional category field to content objects). The tagging of the incoming content objects is with content category information that is obtained from the content marking service 115, which in some embodiments is an ICAP server that implements a content filtering engine. The process for tagging the content objects is discussed further herein below.

The content provider 113 can be any computing device in communication with the access network 101. The access network 101 can be in communication with any number and variety of content providers 113. The content provider 113 can be a server or similar computing device that hosts a set of services and resources such as data stores including web pages, audio/visual content, documents and similar static and/or dynamically generated data.

The content marking service 115 is in communication with the access network 101 and can be situated and implemented by a computing device that is either external or internal to the access network 101. The content marking service 115 can be co-located with other nodes in the access network such as CCN marking nodes 109 or CCN gateways 103 or other CCN router 117 services. The content marking service 115 is responsible for tracking the categories assigned to each content object. The content marking service 115 can obtain the category information by querying the content providers 113, by administrator definition, or by similar mechanisms. In one example embodiment, the content marking service 115 is an ICAP server executing a content filtering engine or similar service.

Figure 2:
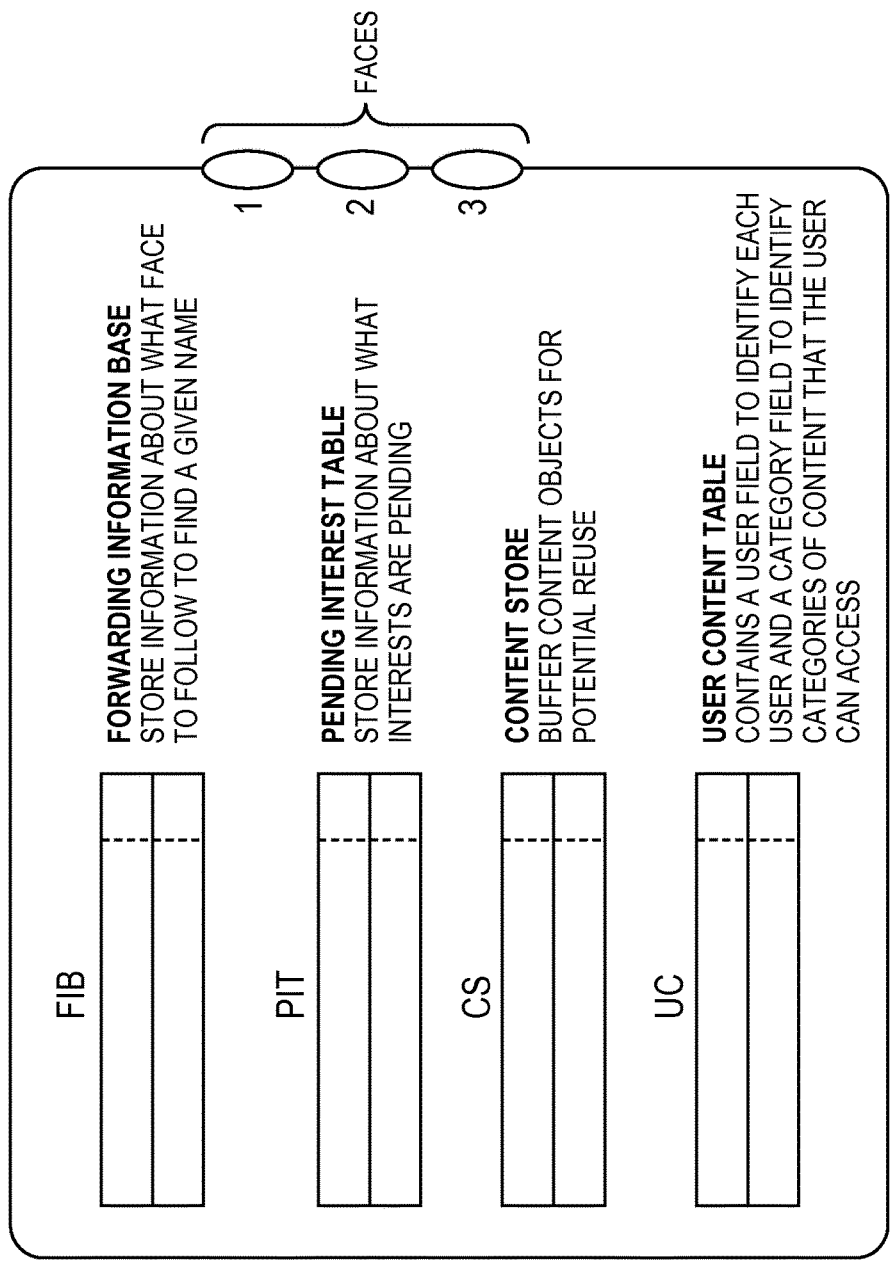
FIG. 2 is a diagram of one embodiment of an example set of data structures maintained by a CCN node serving as either a CCN gateway or CCN marking node.

FIG. 2 is a diagram of one embodiment of the set of data structures maintained by CCN nodes. The CCN nodes such as CCN routers, CCN gateways and CCN marking nodes can maintain three or four sets of tables for tracking information related to CCN. In prior systems, only three tables were typically maintained. The existing CCN tables include the forwarding information base (FIB), the pending interest table (PIT) and the content store (CS). In some embodiments, a fourth table can be maintained in the form of a user content table (UC). The FIB is equivalent to the routing table in IP, where destination addresses and networks for particular content objects identified by CCN names are matched with an output interface. In CCN, the IP prefixes utilized for matching on the routing table are replaced with content name prefixes of the CCN names.

The PIT stores the CCN interest packets that have been received, but that have not been responded to yet. The entries of these CCN interest packets are referred to as 'pending interests' and are removed from the PIT when a corresponding content object is sent toward the originating user equipment that generated the CCN interest packet via the associated ingress port or when the pending interest times out.

The CS is an optional local cache of content objects. This cache is optional and can have any size or store any number of content objects. CCN nodes can choose not to cache anything (for example in a core network where cache size would need to be huge in order to maximize cache hits). In one embodiment, the CS stores a set of recently received content objects. The CS can also optionally store category information for each of the content objects.

In one embodiment, a UC is maintained that includes an entry for each known user or a recent subset of these users that has generated a CCN interest packet that was received by the CCN node. Each entry in the UC can correspond to a user and include a user field to identify a user by a user identifier such as an ingress network interface, a media access control (MAC) address or similar local or globally unique identifier. Each entry can also include category field that identifies each of the categories of content that the user is allowed to access. User information including allowable content categories can be retrieved from subscriber services in the network of the user such as AAA, RADIUS and similar subscriber services. The category information can be encoded using any system or format. In some embodiments, this format is left open to enable local optimization. In one example, categories can be encoded as a set of bits with each bit representing a different category.

Each CCN node also provides a set of network interfaces also referred to as "faces" over which CCN interest packets are received and forwarded and similarly over which CCN response packets are received and forwarded. In the example illustration the CCN node includes three network interfaces, which are faces 1, 2, and 3. These network interfaces can represent a physical link or a Layer 2 interface The network interfaces can also represent, in some embodiments, a transport protocol such as TCP/IP (in overlay mode) or even an application.

The basic data traffic forwarding in CCN is typically performed as explained below with an example sequence:

1. A CCN interest packet arrives through a face (network interface).
2. The CCN node checks whether it has the requested content object stored in its CS.
3. If the content object is found then go to step 7.
4. If the content object is not found in the CS, then a check is made whether the same content has already been requested, by looking for a matching CCN name in the PIT.
5. If is a matching PIT entry is found, then update it by adding the network interface through which the CCN interest was received to the PIT entry. In this case, the process then exits.
6. If no matching PIT entry is found, then a new entry is created for the CCN name, and the CCN interest is forwarded toward the content provider according to CCN name prefix matching using the FIB.
7. When a content object arrives through a network interface in a CCN response packet, then forward the CCN response packet to each of the network interfaces listed in the related PIT entry. If the content object was found in the content store, then forward it to the network interface over which the corresponding CCN interest packet was received.

In the CCN networks of the prior art, the CCN networks are structured such that a single CCN node that can be referred to as a packet gateway performs the role of gateway to the CCN network, such as an access or operator network. In these architectures all the data traffic will go through this packet gateway. For instance, in mobile networks, as mentioned above, there is always a serving gateway and PDN gateway (also known as EPG, Evolved Packet Gateway) that are the only entry/exit points of the access network to other networks such as the Internet. This creates a single point for content filtering, but at the same time this is a bottleneck for the network As shown above, in a CCN network, the requested content may already be cached close to the requesting user equipment, therefore the packet gateway in the prior art architecture may not see all per-user traffic and may not be able to filter it appropriately because the CCN interests are being serviced by caching before they reach the packet gateway. Also, taking a home network as an example, the home network may have multiple users, each with different parental control settings. As CCN packets do not identify the original sender, a filtering system deep in the network is not able to differentiate the parent's traffic from the child's traffic.

Thus, the current state of the art for filtering content in CCN networks is to do it at the source, i.e., the content provider. The content provider must identify requesters using an additional protocol on top of CCN. For example, cryptographic keys can be included in the content name, or a key exchange can take place. In all cases, this means a unique piece of content will have many CCN names depending on which client is requesting it. For CCN's caching feature, a different name equals a conceptually different piece of data. Therefore, these prior art architectures lose the advantage of CCN caching between users.

The embodiments overcome these deficiencies in the prior art CCN architecture to provide content filtering for CCN, while maintaining CCN's full caching abilities. The embodiments overcome these deficiencies by using a CCN marking node to add categories to the content objects and a CCN gateway that is the node closest to the user to enforce the content filtering on a per user basis using the content filtering information provided by the CCN marking node.

In the embodiments provide herein, the CCN marking nodes are in communication either directly or indirectly with a content filtering engine, for example the communication can be through an a separately administered network (i.e., a separate administrative domain), an IP network, an overlay network, an out-of-band communication mechanism or similar communication mechanism. The set of CCN marking nodes must cover all paths to and from the CCN network implementing this content filtering system, e.g., the example access network described above. Further, the CCN gateways have a direct link to the user equipment. The CCN gateways can be software hosted on home or enterprise gateways, radio base stations, at the user equipment, or at similar locations that are the closest point in the CCN network to the user equipment. As mentioned above, CCN gateways in the embodiments presented herein can include an additional table, referred to as the UC, that stores the association between the user identification and the content categories accessible to that user.

The embodiments provide advantages over the prior art systems, the embodiments apply content filtering at the edge of a CCN network which enables reuse of the existing content filtering infrastructure and categorization (e.g., such as that provided by ICAP servers) as well as network gateways (e.g., gateways in LTE and similar architectures). Thus, the system and processes for content filtering and marking provided herein do not require extensive testing and deployment of new content filtering servers and protocols. Rather, only the additional functionality at existing CCN nodes for marking and content filtering is deployed. Further, this distributed approach enables the proper use of caching across users in the CCN network. By filtering content objects at the edge of the CCN network, the embodiments provide a CCN network that benefits more from caching (e.g., reducing latency and network load) and provides better quality of services (i.e., in terms of latency and load) to adjoining networks.

Marking Process

Figure 3:
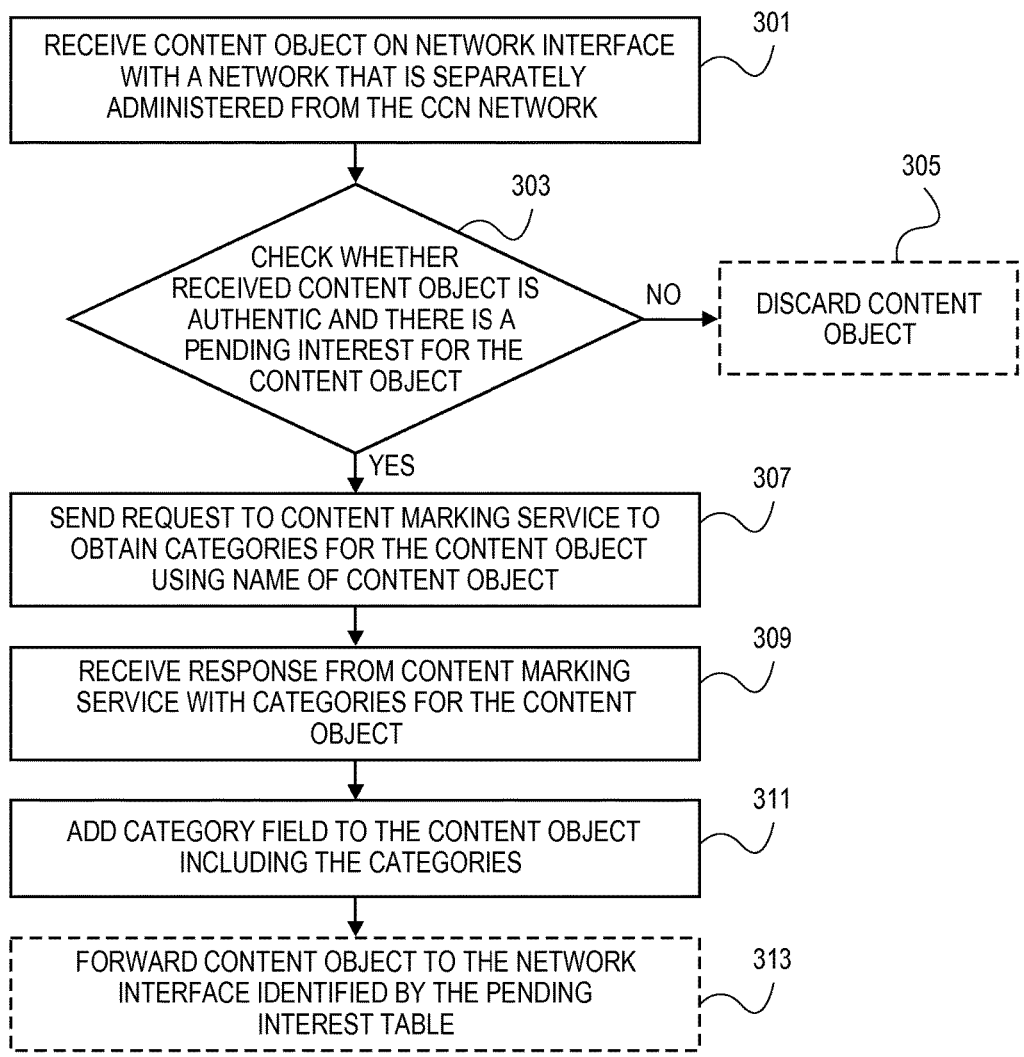
FIG. 3 is a flowchart of one embodiment of a process for marking content objects at a CCN marking node.

FIG. 3 is a flowchart of one embodiment of a process for marking content objects at a CCN marking node. The marking of the content objects is carried out by the CCN marking node when the CCN marking node receives a content object in a CCN response packet or similar message on a network interface (Block 301). A check is then made whether the received content object is authentic and whether there is a pending interest for the content object (Block 303). The check is made by looking up the content object using its CCN name in the PIT. If no match is found in the PIT, then the content object is discarded (Block 305). If a match is found, then a request is sent to the content marking service to obtain the categories for the content object (Block 307). The request sent to the content marking service includes the CCN name of the received content object. In one example embodiment, the content marking service is provided by an ICAP server, which utilizes a TCP connection and stores a database of categories that can be queried. The ICAP server would be populated with the CCN names of content objects and paired with the associated categories.

In response to the request sent to the content marking service, the CCN marking node will receive a response with the categories for the content object (Block 309). The request and response sent to the content marking service can have any format and can utilize any protocol. Similarly, the identification of the categories can have any format or encoding to identify each of the defined categories for content objects that enable filtering based on these categories. Using this received content object categories from the content marking service, the CCN marking node can add a category field to the content object to identify each of the categories associated with the content object (Block 311). In one embodiment, the form of the content tag is a type length value (TLV) that is added to the content object. Any type of encoding or format can be used in the category field to identify categories.

Figure 4:
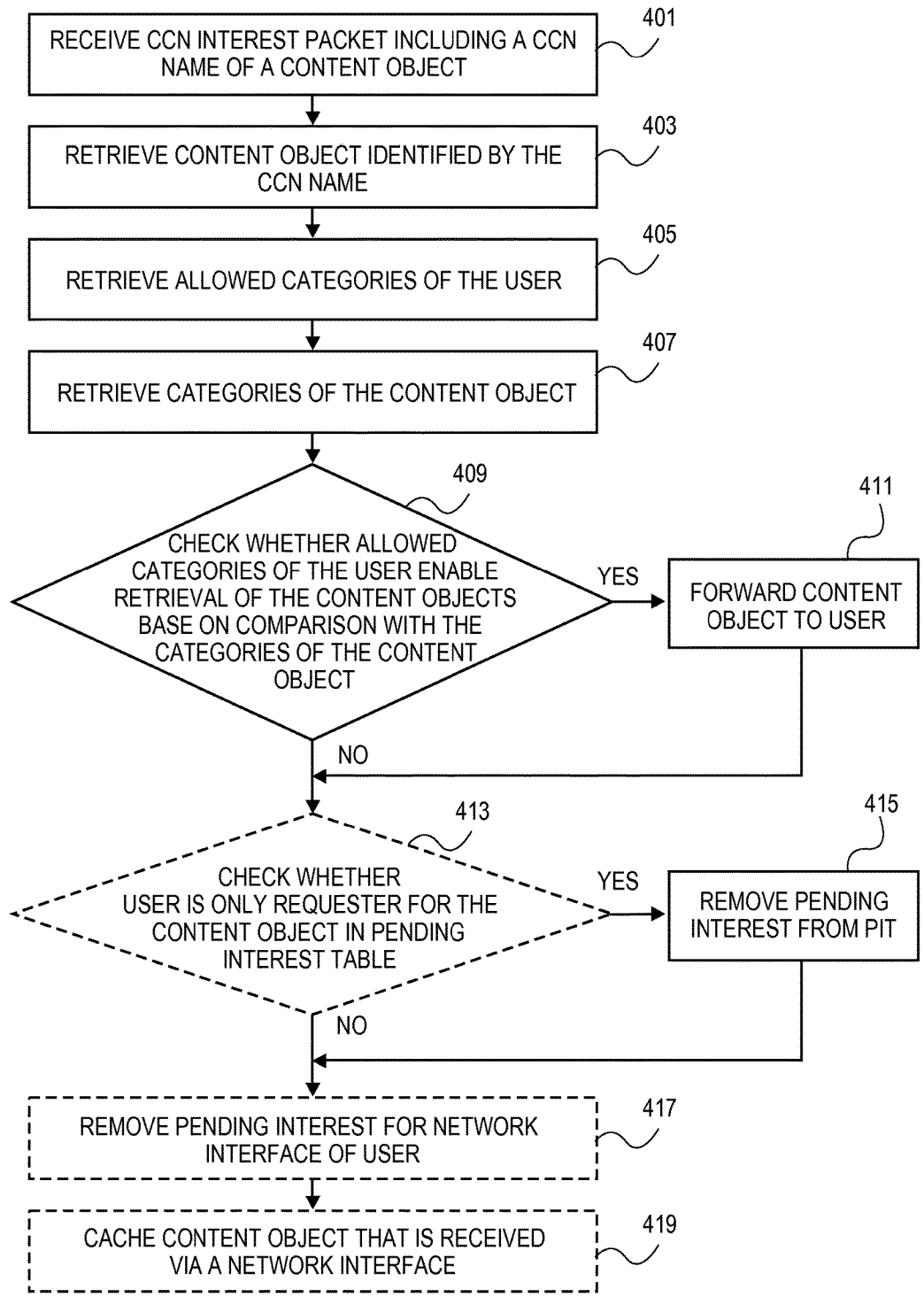
FIG. 4 is a flowchart of one embodiment of the content filtering process.

Once the category field has been added to the content object, then the content object can be forwarded toward the requesting user/user equipment (Block 313). The forwarding utilizes a matching PIT entry to identify each of the network interfaces to forward a CCN response message containing the modified content object with the category field. In some embodiments, the content object can also be added to a content store local to the CCN marking node such that further CCN interest packets for the same content object can be services returning the content object and category node without having to forward a CCN interest toward the content provider service Content Filtering Process FIG. 4 is a flowchart of one embodiment of the content filtering process. The content filtering process is carried out by a CCN gateway. In one embodiment, the process of content filtering starts in response to receiving a CCN interest packet (Block 401). The CCN interest packet includes a CCN name identifying the content object requested by the originator of the CCN interest packet, which is a user and/or a user equipment. The CCN interest packet does not include an explicit identifier of an originating user or user equipment. However, the CCN gateway and user equipment may have an established session or similar connection that enables the CCN gateway to obtain user or user equipment identification. Similarly, the CCN gateway can be in contact with a subscriber service or similar service that provides user identification information. The CCN gateway can also associate the received CCN interest packet with the network interface over which the CCN interest packet is received.

The CCN gateway then retrieves the content object identified by the CCN name (Block 403). This can involve checking a local cache such as a content store if such a local cache exists. If the content object is found in the local cache then the retrieval process is complete. If a local cache does not exist or the content object is not found in the cache, then the process can forward the CCN interest toward a content provider and record an entry in a PIT. Once the CCN response is received with the content object then the process can continue.

After the content object is found, then the process can retrieve the allowed categories of the user (Block 405) and the categories associated with the content object (Block 407). These two steps can be performed in any order and can be performed in parallel. The retrieval of the user allowed categories can be done by looking the user up in the UC. If there is no UC or the UC does not include entry for the user, then the process continues by querying a service such as a subscriber service, an authentication service such as a RADIUS or similar service. In other embodiments, the user or user equipment or similar source can provide the allowed category information. The content categories for the content object will be stored with the locally cached content object or will be returned in the CCN response packet. The CCN marker node will have intercepted the CCN response message and added the category field to the content object before it is returned and cached by the CCN gateway.

Using the user allowed categories and the category information of the content object, a comparison can be made to determine whether the user is allowed to access the content object (Block 409). If the user is allowed to access the content object, then the CCN gateway can forward the content object toward the user according to the interfaces tracked in the PIT (Block 411). After the content object is forwarded toward the user, or if the user does not have access to the content object, a check is made whether the user was the only requester for the content object in the PIT (Block 413). The PIT entry will identify each network interface and in some embodiments can be augmented to identify the user or user equipment. If the PIT entry indicates only a single requester for the content object, then the pending interest entry for the content object in the PIT table can be removed.

However, if there were additional users or user equipment requesting the same content object, then only the network interface or similar identifier information specific to the user is removed from the PIT entry instead of removing the entire PIT entry (Block 417). In some embodiments, the receipt of the content object will cause the content object to be forwarded to other users on other network interfaces in parallel to this analysis for a particular user and in response to a particular CCN interest. Once the PIT has been appropriately updated, then the content object can optionally be cached in the local content store, if there is a local content store at the CCN gateway (Block 419).

Example Embodiments

Figure 5:
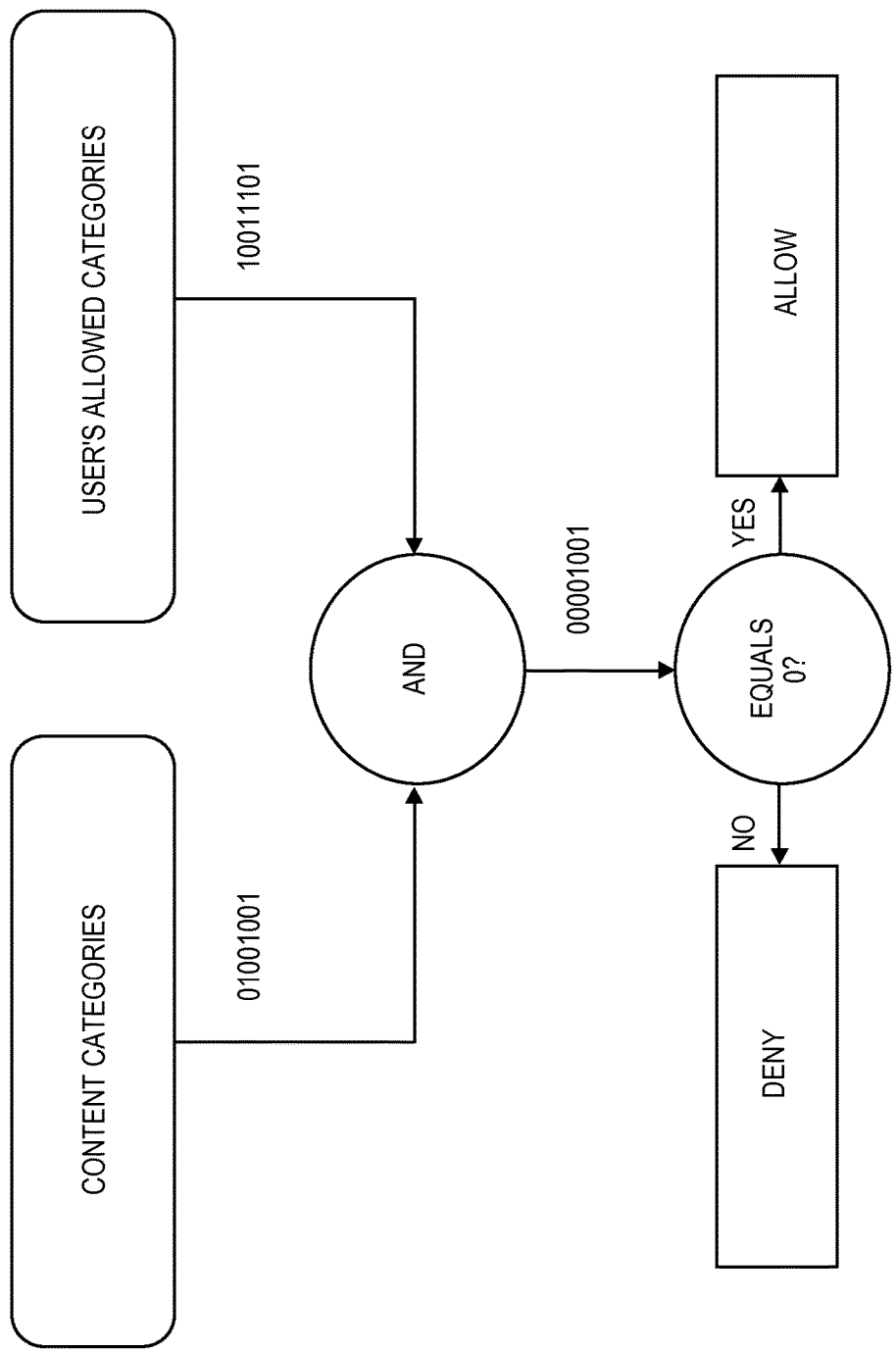
FIG. 5 is a diagram of one embodiment of an example content filtering implementation.

FIG. 5 is a diagram of one embodiment of an example content filtering implementation. In this example implementation, the content categories of a content object and the allowed categories of a user are encoded as a set of bits, with each bit representing a particular category. A set bit or '1' in a particular position indicates that a content object belongs to an associated category and that the user is allowed access to that category, respectively. This bitwise encoding in provided by way of example and not of limitation. Using a bitwise encoding associates each bit position with a particular category and the number of bits utilized matches the number of categories.

Using this example implementation the bits of the content categories of the content object and the bits of the user allowed content categories can be combined bitwise with a logical AND operation. If the result of the logical AND operation is a set of 0s, then this indicates a match between the content categories of the content object and the set of categories that the user has permission to access. Thus, in instances where the result is a set of 0s, then access to the content object is allowed and in other cases the access is denied.

In contexts where this is implemented at a CCN gateway, then the result of this comparison determines whether a CCN interest request will be replied to with a CCN response including the requested content object. In cases where categories match, the CCN response would be sent with the content object. However, where the categories do not match, then an error response or similar response that does not include the requested content object may be sent toward the originating user equipment.

Figure 6:
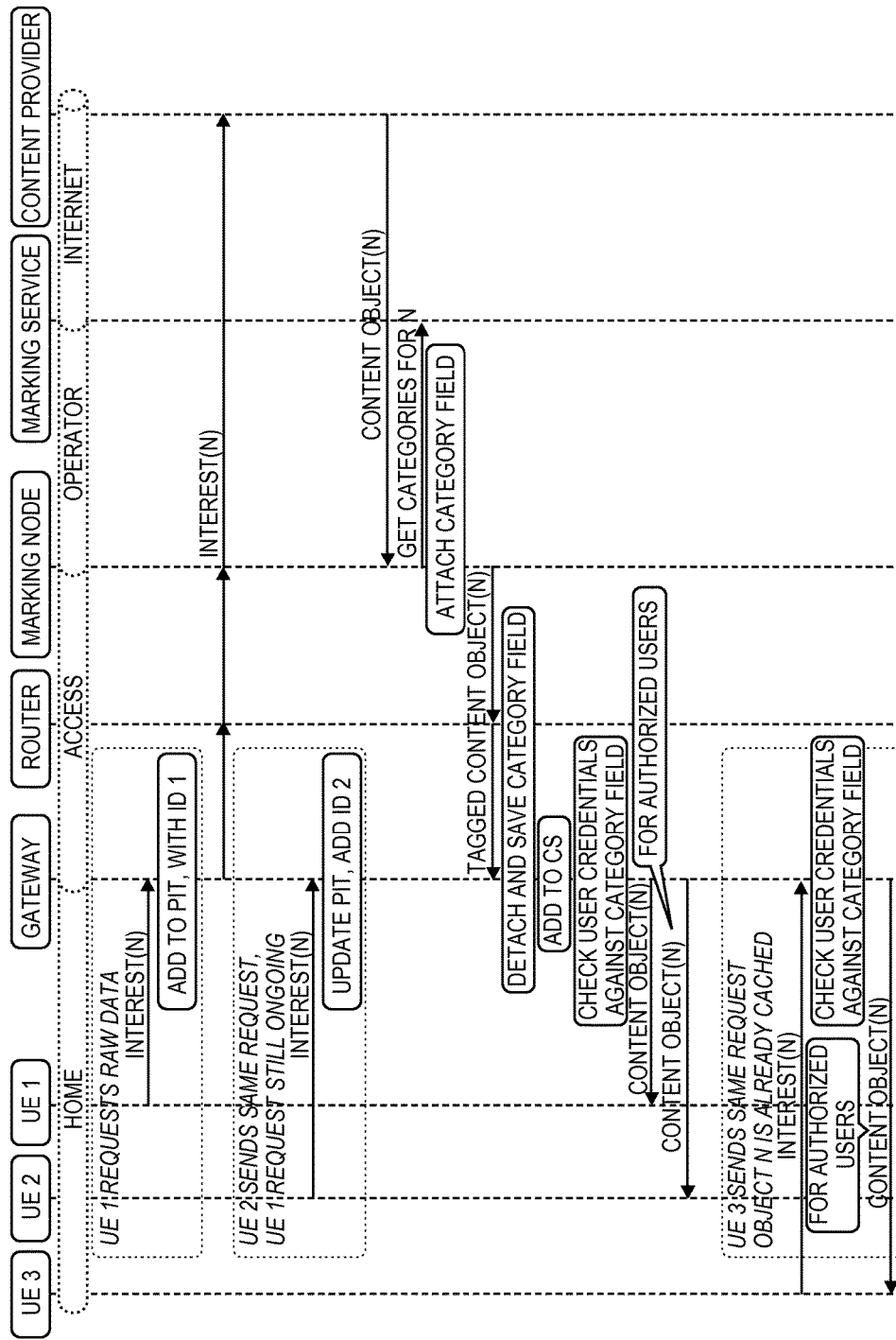
FIG. 6 is a timing diagram demonstrating one embodiment of the content marking and filtering process.

FIG. 6 is a timing diagram demonstrating one embodiment of the content marking and filtering process. This example timing diagram is consistent with the example network illustrated in FIG. 1. The timing diagram demonstrates an example scenario where the per user content filtering would be applied across the entire network encompassing the functions carried out by the CCN gateway and the CCN marking node. Starting at the top of the diagram and progressing downward, the first action is a request generated by the first user equipment (UE1), where UE1 generates a CCN interest for a particular content object 'raw data.' The CCN interest is sent from UE1 to the CCN gateway, which is the first location to process this CCN interest. The CCN gateway adds an entry for the requested content object to the PIT with an identifier of 1. The CCN gateway would check a local content store if available, but in this case the requested content object was not found. The CCN gateway node then forwards the CCN interest packet to the next hop toward the content provider of the content object based on the forwarding information. In this case the next hop in the CCN access network is the CCN router, which in turn forwards the CCN interest to the content provider.

In this example, a second user equipment (UE2) generates a second CCN interest packet and sends it to the CCN gateway. This CCN interest packet is for the same content object that was requested by UE1. This CCN interest packet reaches the CCN gateway which updates the existing PIT entry for the content object by matching the CCN name of the content object. The existing PIT entry is updated by adding the network face identifier or similar identifier for the UE2 to the PIT entry.

While the second CCN interest is being generated and sent, the content provider responds to the first CCN interest packet with a CCN response packet including the requested content object. This CCN response packet is received by the CCN marking node. The CCN marking node queries the CCN marking service (e.g., an ICAP server or similar service) to get the categories for the content object. The CCN marking service replies with the categories of the content object and the CCN marking node adds a category field to the content object such as a category TLV.

The CCN response packet is then forwarded by the CCN marking node to the CCN gateway, where the CCN response packet now includes the updated content object that includes the category field. The CCN gateway then processes the incoming CCN response packet by saving the content object and the associated categories to the local content store or similar storage allocation. The content filtering is then implemented by checking the authentication of the users requesting this content object (i.e., UE1 and UE2) as well as whether each requesting user has permission (i.e., allowed categories) that match the categories of the content object. Where there is a match of user categories and content object categories, then the content object is returned to each of the users (UE1 and UE2).

In addition, with the content object now cached at the CCN gateway further requests, for example by a third user equipment (UE3), can be serviced entirely by the CCN gateway, which has a locally stored copy of the content object and the associated categories. The CCN gateway can check the user authentication and match the user allowed categories against the content object categories, then send the CCN response packet if these match. This example scenario is provided by way of illustration not limitation.

Architecture

Figure 7:
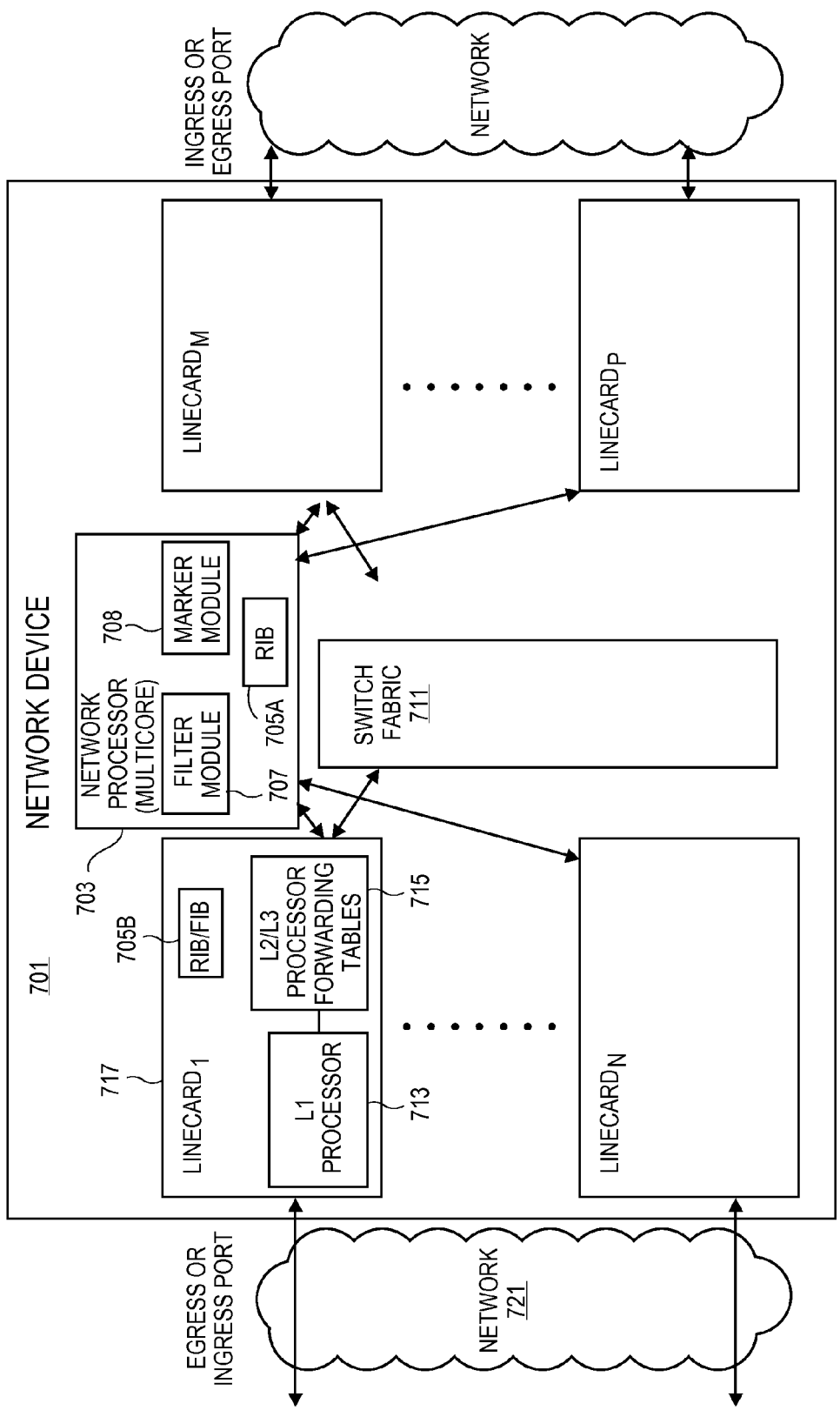
FIG. 7 is a diagram of one embodiment of a network device (ND) implementing an iterative process for content filtering and marking.

FIG. 7 is a diagram of one embodiment of a network device implementing the content filtering and marking processes. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a network device 701 or similar computing device. The network device 701 can have any structure that enables it to receive data traffic and forward it toward its destination. The network device 701 can include a network processor 703 or set of network processors that execute the functions of the network device 701. A 'set,' as used herein, is any positive whole number of items including one item. The network device 701 can execute either a filter module 707 to implement the functions of filtering where the network device 701 functions as a CCN gateway as described herein above via a network processor 703 or can implement a marker module 708 to implement the content marking functions where the network device 701 functions as a CCN marking node. In many scenarios only one of the filter module 707 or marker module 708 would be present on a network device 701, however it is possible that a single network device can function as both a CCN gateway and a CCN marking node where the network device 701 connect with separately administered networks that have both user equipment and content providers. The network processor 703 can implement the filter module 707 and/or the marker module 708 as a discrete hardware, software module or any combination thereof. The network processor 703 can also service the routing information base 705A and similar functions related to data traffic forwarding and network topology maintenance. The routing information base 705A can be implemented as match action tables that are utilized for forwarding protocol data units PDUs (i.e. packets). The functions of the filter module 707 and marker module 708 can be implemented as modules in any combination of software, including firmware, and hardware within the network device. The functions of the filter module 707 and marker module 708 that are executed and implemented by the network device 701 include those described further herein above.

In one embodiment, the network device 701 can include a set of line cards 717 that process and forward the incoming data traffic toward the respective destination nodes by identifying the destination and forwarding the data traffic to the appropriate line card 717 having an egress port that leads to or toward the destination via a next hop. These line cards 717 can also implement the forwarding information base 705B, or a relevant subset thereof. The line cards 717 can also implement or facilitate the filter module 707 and marker module 708 functions described herein above. The line cards 717 are in communication with one another via a switch fabric 711 and communicate with other nodes over attached networks 721 using Ethernet, fiber optic or similar communication links and media.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 701 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 8A:
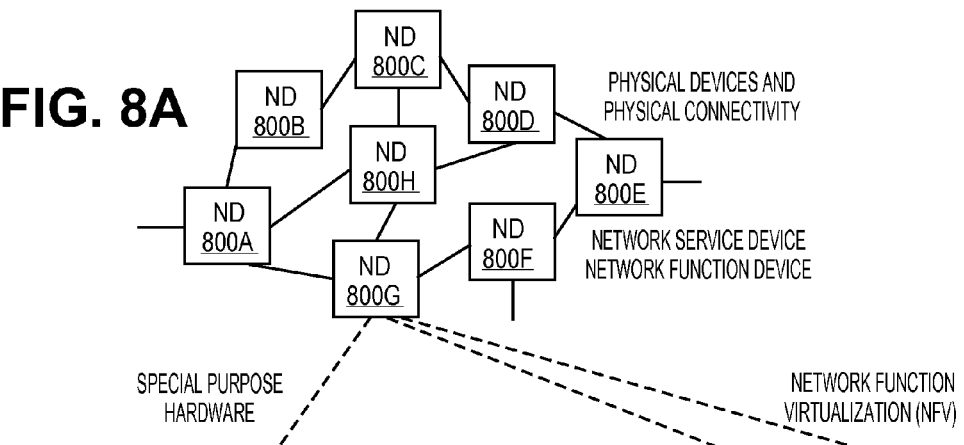
FIG. 8A illustrates connectivity between network devices (NDs) within an exemplary network, as well as three exemplary implementations of the NDs, according to some embodiments of the invention.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 802 that uses custom application—specific integrated—circuits (ASICs) and a proprietary operating system (OS); and 2) a general purpose network device 704 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 610 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A). In some embodiments, the control communication and configuration module 832A encompasses the filter module 833A and marker module 836A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) (i.e. implemented as match action tables) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) are to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
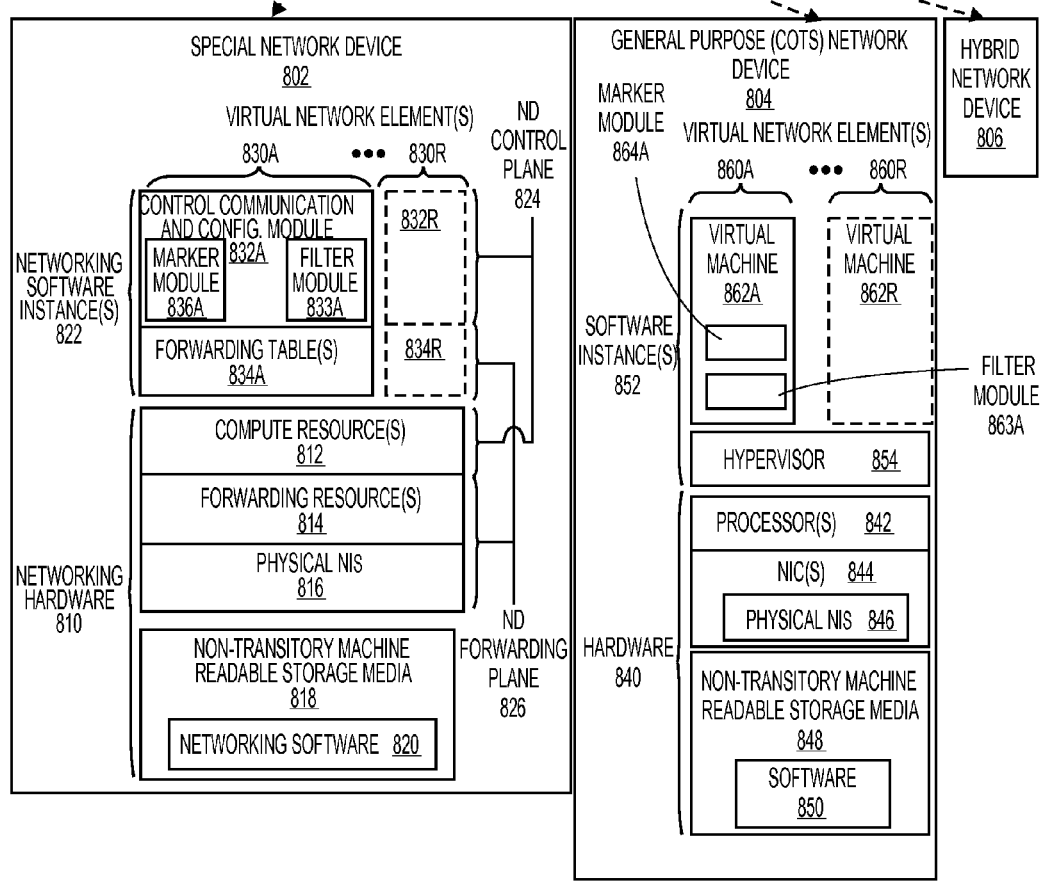
FIG. 8B illustrates an exemplary way to implement the special-purpose network device according to some embodiments of the invention.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate a hypervisor 854 (sometimes referred to as a virtual machine monitor (VMM)) and one or more virtual machines 862A-R that are run by the hypervisor 854, which are collectively referred to as software instance(s) 852. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 862A-R, and that part of the hardware 840 that executes that virtual machine (be it hardware dedicated to that virtual machine and/or time slices of hardware temporally shared by that virtual machine with others of the virtual machine(s) 862A-R), forms a separate virtual network element(s) 860A-R. In some embodiments, the virtual machine module 862A encompasses filter module 863A and marker module 864A.

The virtual network element(s) 860A-R perform similar functionality to the virtual network element(s) 830A-R. For instance, the hypervisor 854 may present a virtual operating platform that appears like networking hardware 810 to virtual machine 862A, and the virtual machine 862A may be used to implement functionality similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 862A-R differently. For example, while embodiments of the invention are illustrated with each virtual machine 862A-R corresponding to one VNE 860A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 854 includes a virtual switch that provides similar forwarding services as a physical Ethernet switch. Specifically, this virtual switch forwards traffic between virtual machines and the NIC(s) 844, as well as optionally between the virtual machines 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special-purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R that are implementations of match action tables (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach). In some embodiments, the centralized reachability and forwarding module 879 encompasses content filtering functions in corresponding filter module 881 as described herein above as well as content marking functions in corresponding marker module 882 as described herein above.

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
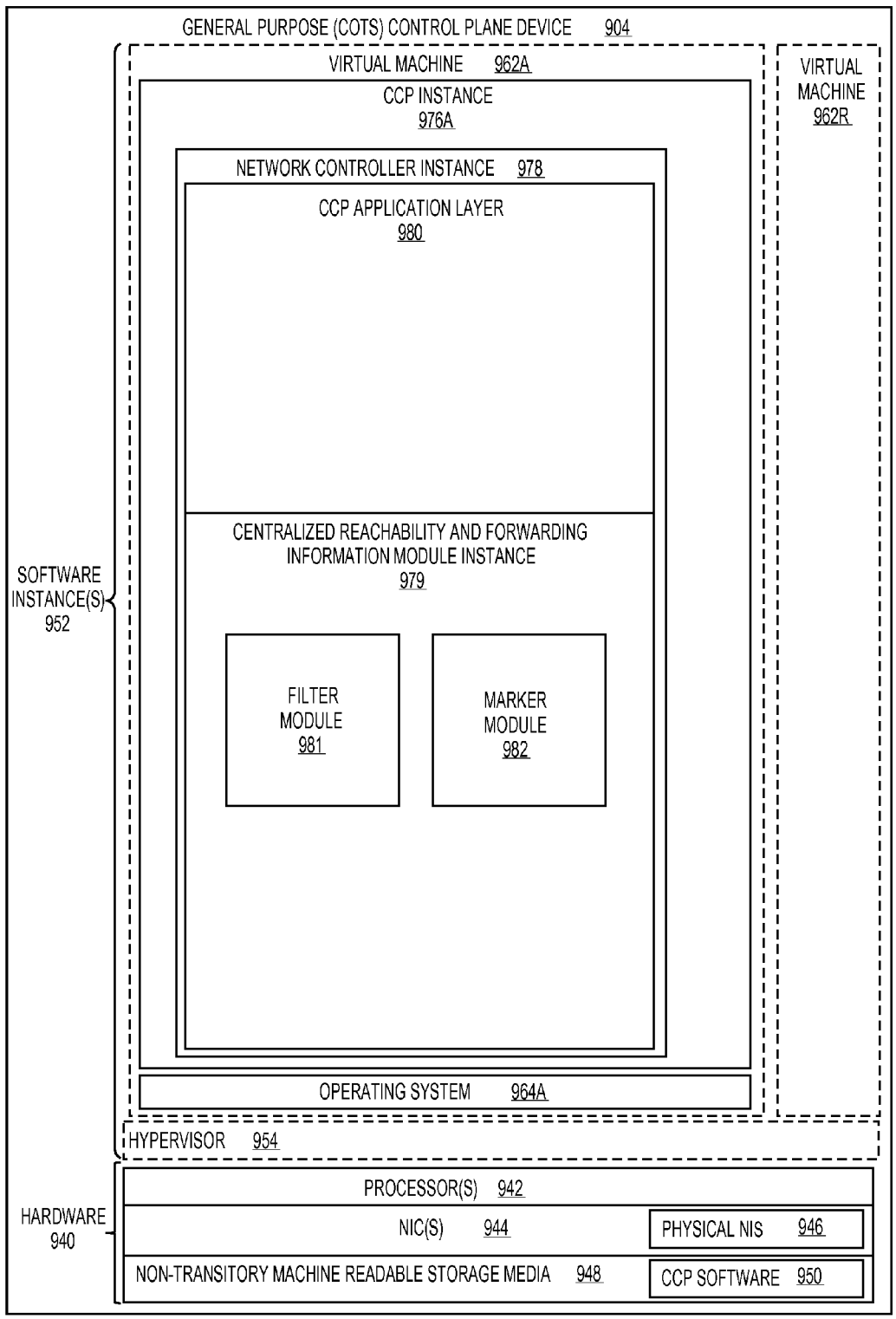
FIG. 9 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 846), as well as non-transitory machine readable storage media 848 having stored therein centralized control plane (CCP) software 950.

In embodiments that use compute virtualization, the processor(s) 942 typically execute software to instantiate a hypervisor 954 (sometimes referred to as a virtual machine monitor (VMM)) and one or more virtual machines 962A-R that are run by the hypervisor 954; which are collectively referred to as software instance(s) 952. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 950 (illustrated as CCP instance 976A) on top of an operating system 864A are typically executed within the virtual machine 962A. In embodiments where compute virtualization is not used, the CCP instance 976A on top of operating system 864A is executed on the "bare metal" general purpose control plane device 904.

The operating system 964A provides basic processing, input/output (I/O), and networking capabilities. In some embodiments, the CCP instance 976A includes a network controller instance 978. The network controller instance 978 includes a centralized reachability and forwarding information module instance 979 (which is a middleware layer providing the context of the network controller 978 to the operating system 964A and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view. The CCP application can encompass the functionality of filter module 981 and the marker module 982 as described herein above.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-wbased forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for filtering content objects on a per user basis at a gateway node in a content centric networking (CCN) network, where the gateway node has a network interface with a network of a user device originating a CCN interest packet, the CCN network in communication with a content provider and a separate content marking service, the method comprising:
    receiving the CCN interest packet by the gateway node, the CCN interest packet including a CCN name and a user identity;
    retrieving at the gateway node content object identified by the CCN name, where the CCN name uniquely identifies the content object within a globally shared namespace within the CCN network, where the content object originated with the content provider;
    retrieving allowed categories of a user;
    retrieving categories of the content object determined by the content marking service where categories identify types of content in the content object;
    checking, by the gateway node whether the allowed categories of the user enable retrieval of the content object based on comparison with the categories of the content object; and
    forwarding by the gateway node the content object to the user in response to the allowed categories of the user enabling retrieval of the content object for the user.

2. The method of claim 1, further comprising:
    storing the categories of the content object received from a marking node in a user content table.

3. The method of claim 1, further comprising:
requesting the allowed categories of the user from any one of a subscriber service or an authentication service.

4. The method of claim 1, further comprising:
performing a logical AND operation on bitwise representation of the allowed categories of the user and the categories of the content object.

5. The method of claim 2, further comprising:
caching the content object in a content store of the gateway node where the content object is received via an external network interface in response to the CCN interest packet.

6. A network device implementing a method for filtering content objects on a per user basis at a gateway node in a content centric networking (CCN) network, where the gateway node has a network interface with a network of a user device originating a CCN interest packet, the CCN network in communication with a content provider and a separate content marking service, the network device comprising:
- a non-transitory computer-readable medium having stored therein a filter module; and
- a processor coupled to the non-transitory computer-readable medium, the processor configured to execute the filter module, the filter module configured to receive the CCN interest packet including a CCN name and a user identity, to retrieve a content object identified by the CCN name, where the CCN name uniquely identifies the content object within a globally shared namespace within the CCN network, where the content object originated with the content provider, to retrieve allowed categories of a user, to retrieve categories of the content object determined by the content marking service where categories identify types of content in the content object, to check whether the allowed categories of the user enable retrieval of the content object based on comparison with the categories of the content object, and to forward the content object to the user in response to the allowed categories of the user enabling retrieval of the content object for the user.

7. The network device of claim 6, wherein the processor is further configured to execute the filter module that is configured to store the categories of the content object received from a marking node in a user content table.

8. The network device of claim 6, wherein the processor is further configured to execute the filter module that is configured to request the allowed categories of the user from any one of a subscriber service or an authentication service.

9. The network device of claim 6, wherein the processor is further configured to execute the filter module that is configured to perform a logical AND operation on bitwise representation of the allowed categories of the user and the categories of the content object.

10. The network device of claim 6, wherein the processor is further configured to execute the filter module that is configured to cache the content object in a content store of the gateway node where the content object is received via an external network interface in response to the CCN interest packet.

11. A computing device implementing a plurality of virtual machines for implementing network function virtualization (NFV), wherein a virtual machine from the plurality of virtual machines is configured to execute a method for filtering content objects on a per user basis at a gateway node in a content centric networking (CCN) network, where the gateway node has a network interface with a network of a user device originating a CCN interest packet, the CCN network in communication with a content provider and a separate content marking service, the computing device comprising:
- a non-transitory computer-readable medium having stored therein a content filter module; and
- a processor coupled to the non-transitory computer-readable medium, the processor configured to execute the virtual machine, the virtual machine to execute the filter module, the filter module configured to receive the CCN interest packet including a CCN name and a user identity, to retrieve a content object identified by the CCN name, where the CCN name uniquely identifies the content object within a globally shared namespace within the CCN network, where the content object originated with the content provider, to retrieve allowed categories of a user, to retrieve categories of the content object determined by the content marking service where categories identify types of content in the content object, to check whether the allowed categories of the user enable retrieval of the content object based on comparison with the categories of the content object, and to forward the content object to the user in response to the allowed categories of the user enabling retrieval of the content object for the user.

12. The computing device of claim 11, wherein the processor is further configured to execute the filter module that is configured to store the categories of the content object received from a marking node in a user content table.

13. The computing device of claim 11, wherein the processor is further configured to execute the filter module that is configured to request the allowed categories of the user from any one of a subscriber service or an authentication service.

14. The computing device of claim 11, wherein the processor is further configured to execute the filter module that is configured to perform a logical AND operation on bitwise representation of the allowed categories of the user and the categories of the content object.

15. The computing device of claim 11, wherein the processor is further configured to execute the filter module that is configured to cache the content object in a content store of the gateway node where the content object is received via an external network interface in response to the CCN interest packet.

16. A control plane device to implement at least one centralized control plane for a software defined network (SDN), the centralized control plane configured to execute a method for filtering content objects on a per user basis at a gateway node in a content centric networking (CCN) network, where the gateway node has a network interface with a network of a user device originating a CCN interest packet, the CCN network in communication with a content provider and a separate content marking service, the control plane device comprising:
- a non-transitory computer-readable medium having stored therein a filter module; and
- a processor coupled to the non-transitory computer-readable medium, the processor configured to execute the filter module, the filter module configured to receive the CCN interest packet including a CCN name and a user identity, to retrieve a content object identified by the CCN name, where the CCN name uniquely identifies the content object within a globally shared namespace within the CCN network, where the content object originated with the content provider, to retrieve allowed categories of a user, to retrieve categories of the content object determined by the content marking service where categories identify types of content in the content object, to check whether the allowed categories of the user enable retrieval of the content object based on comparison with the categories of the content object, and to forward the content object to the user in response to the allowed categories of the user enabling retrieval of the content object for the user.

17. The control plane device of claim 16, wherein the processor is further configured to execute the filter module that is configured to store the categories of the content object received from a marking node in a user content table.

18. The control plane device of claim 16, wherein the processor is further configured to execute the filter module that is configured to request the allowed categories of the user from any one of a subscriber service or an authentication service.

19. The control plane device of claim 16, wherein the processor is further configured to execute the filter module that is configured to perform a logical AND operation on bitwise representation of the allowed categories of the user and the categories of the content object.

20. The control plane device of claim 16, wherein the processor is further configured to execute the filter module that is configured to cache the content object in a content store of the gateway node where the content object is received via an external network interface in response to the CCN interest packet.

* * * * *